(12) United States Patent
Sharif (10) Patent No.: US 12,220,972 B2
(45) Date of Patent: Feb. 11, 2025

(54) VEHICLE SUNVISOR ASSEMBLY

(71) Applicant: NISSAN NORTH AMERICA, INC., Franklin, TN (US)

(72) Inventor: Curtis Sharif, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 254 days.

(21) Appl. No.: 17/853,873

(22) Filed: Jun. 29, 2022

(65) Prior Publication Data

US 2024/0001740 A1    Jan. 4, 2024

(51) Int. Cl.
*B60J 3/02* (2006.01)
*B60J 1/20* (2006.01)

(52) U.S. Cl.
CPC ........... *B60J 3/0234* (2013.01); *B60J 1/2077* (2013.01)

(58) Field of Classification Search
CPC ....... B60J 3/0234; B60J 1/2077; B60J 3/0278
See application file for complete search history.

(56) References Cited

U.S. PATENT DOCUMENTS

| | | | | |
|---|---|---|---|---|
| 5,101,878 A | * | 4/1992 | Thomas | E06B 9/40 160/370.22 |
| 7,216,917 B2 | * | 5/2007 | Tadakamalla | B60J 1/2016 296/97.4 |
| 9,039,064 B1 | * | 5/2015 | Baude | B60J 1/2072 296/193.06 |
| 2010/0060028 A1 | * | 3/2010 | Patel | B60J 3/0208 296/97.1 |
| 2022/0194185 A1 | * | 6/2022 | Bornholdt | B60J 1/2052 |
| 2024/0166031 A1 | * | 5/2024 | Pérez Fontaneda | B60J 3/0243 |

* cited by examiner

*Primary Examiner* — Paul N Dickson
*Assistant Examiner* — Sara Laghlam
(74) *Attorney, Agent, or Firm* — Global IP Counselors, LLP (57) ABSTRACT

A vehicle sunvisor assembly includes a portion of a vehicle body structure and a retractable sunvisor assembly. The vehicle body structure includes an A-pillar, a windscreen and a roof structure with the A-pillar and the windscreen extending downward from the roof structure. The retractable sunvisor assembly is attached to the A-pillar below the roof structure such that in a retracted orientation the retractable sunvisor assembly is positioned along-side the A-pillar and in an extended in-use orientation a portion of the retractable sunvisor assembly extends away from the A-pillar covering an upper area of the windscreen.

5 Claims, 8 Drawing Sheets

VEHICLE SUNVISOR ASSEMBLY

BACKGROUND

Technical Field

The present disclosure generally relates to vehicle sunvisor assembly. More specifically, the present disclosure relates to sunvisor assembly that is attached to and is operable to extend laterally from an A-pillar of a vehicle.

Background Information

A vehicle sunvisor is typically installed to a roof structure and/or headliner of a vehicle.

SUMMARY

It has been discovered that removing a sunvisor from a conventional location above the head of a vehicle passenger provides greater headroom above the above the passenger.

One object of the present disclosure is to provide increased headroom above a vehicle passenger's head.

In view of the state of the known technology, one aspect of the present disclosure is to provide a vehicle sunvisor assembly includes a portion of a vehicle body structure and a retractable sunvisor assembly. The vehicle body structure includes an A-pillar, a windscreen and a roof structure with the A-pillar and the windscreen extending downward from the roof structure. The retractable sunvisor assembly is attached to the A-pillar below the roof structure such that in a retracted orientation the retractable sunvisor assembly is positioned along-side the A-pillar and in an extended in-use orientation a portion of the retractable sunvisor assembly extends away from the A-pillar covering an upper area of the windscreen.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
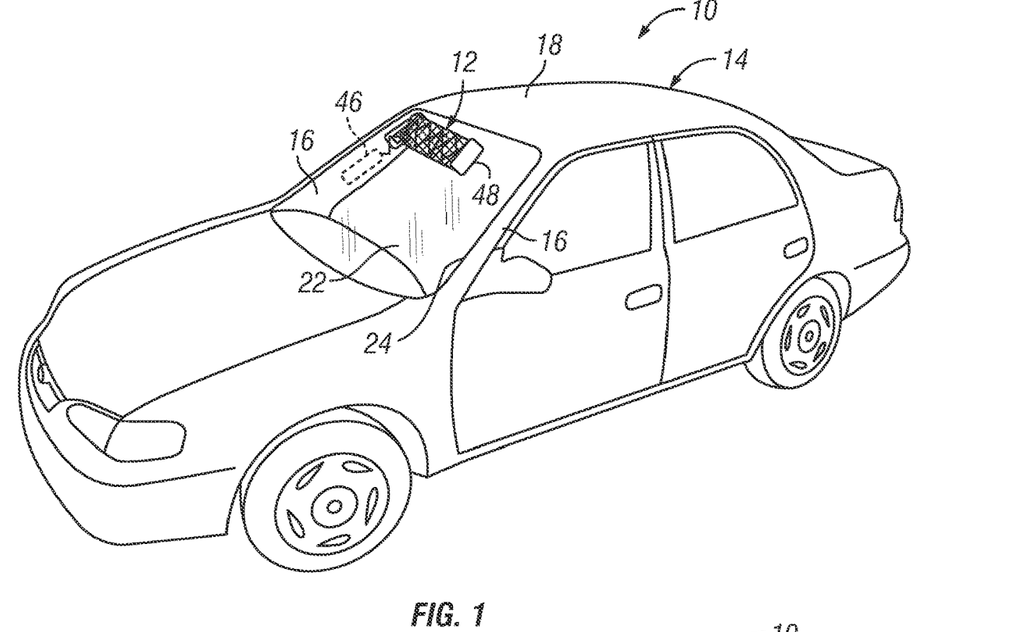
FIG. 1 is a perspective view of a vehicle that has a vehicle body structure with a retractable sunvisor assembly attached to an A-pillar of the vehicle in accordance with a first embodiment.

Referring initially to FIG. 1, a vehicle 10 having a retractable sunvisor assembly 12 is illustrated in accordance with a first embodiment.

The vehicle 10 also includes a vehicle body structure 14 that has, among other structural features, A-pillars 16, a roof structures 18, cowl structure 20 and a windscreen 22, The A-pillars 16, the roof structure 18 and the cowl structure 20 define an opening 24 that receives the windscreen 20 in a conventional manner.

The windscreen 20 (also referred to as a windshield) is secured to the A-pillars 16, the roof structure 18 and the cowl structure 20 such that the windscreen extends downward from the roof structure 18 to the cowl structure 20 and between the two A-pillars 16.

The A-pillars 16 are identical except that they are symmetrical mirror images of one another. Therefore, the description below includes description of only one of the A-pillars 16 but applies equally to both A-pillars 16.

Figure 2:
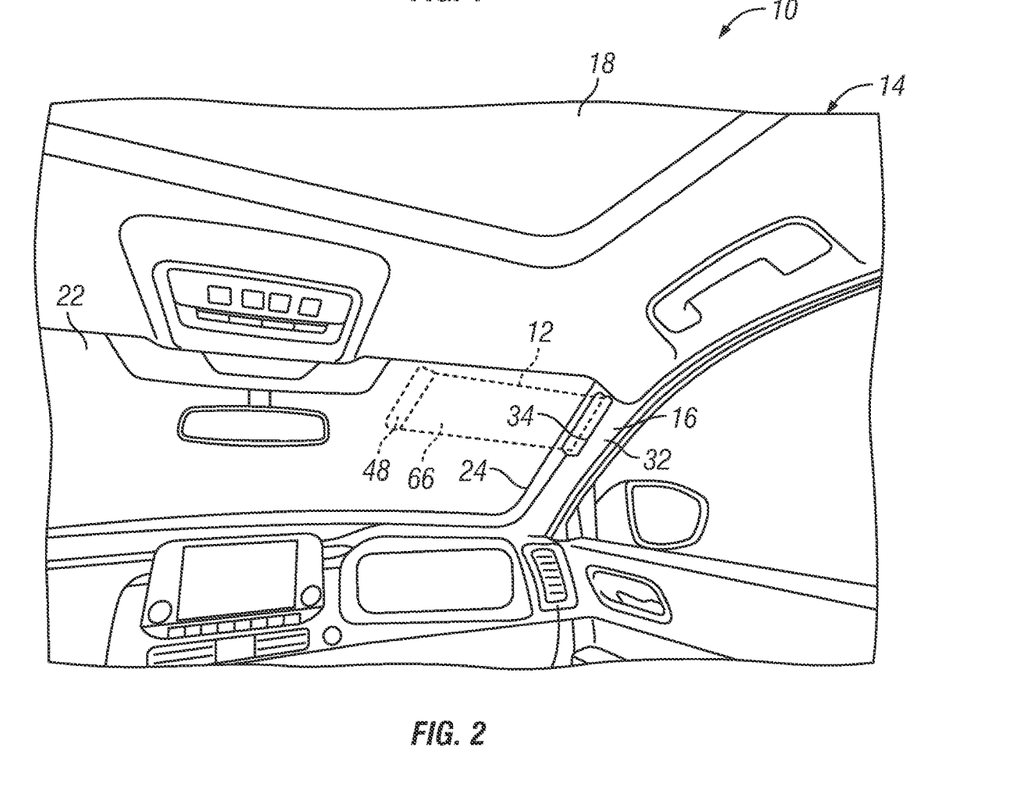
FIG. 2 is a perspective view of a forward portion of a passenger compartment within the vehicle body structure showing a windscreen, the A-pillar and the retractable sunvisor assembly in accordance with the first embodiment.
Figure 3:
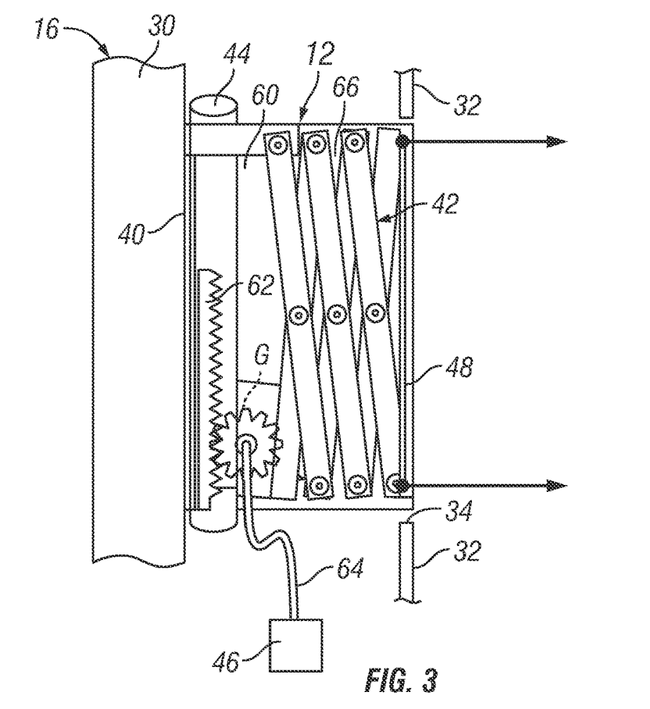
FIG. 3 is a schematic front view of a portion of the A-pillar and the retractable sunvisor assembly with the retractable sunvisor assembly in a retracted or stowed orientation in accordance with the first embodiment.
Figure 4:
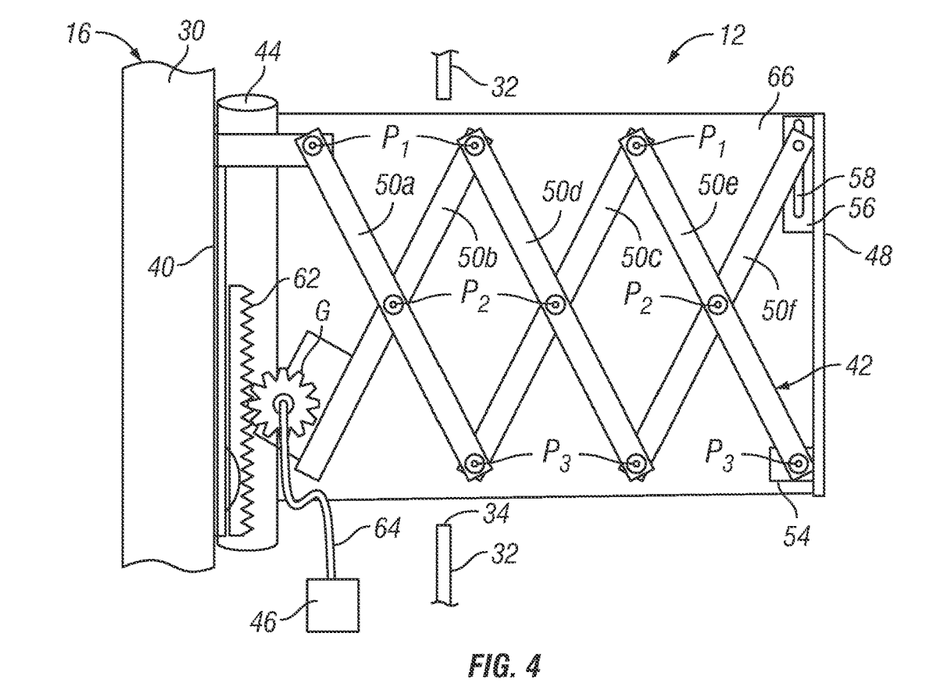
FIG. 4 is another schematic front view of the portion of the A-pillar and the retractable sunvisor assembly depicted in FIG. 3 with the retractable sunvisor assembly in a partially extended or in-use orientation in accordance with the first embodiment.

As shown in FIGS. 2-4, the A-pillar 16 includes at least one pillar member 30, a trim assembly 32 (also referred to as an A-pillar trim assembly 32) and the retractable sunvisor assembly 12. The pillar member 30 can be one of several panels or elements welded to one another to define the pillar member 30, depending upon the design of the vehicle 10 and/or the type of vehicle (for example, an SUV, a sedan, a coupe, a truck or a van). For the sake of brevity, the pillar member 30 is shown as a single member in FIGS. 3 and 4.

The trim assembly 32 is a single panel or can be an assembly of elements that cover and conceal the pillar member 30. The A-pillar trim assembly is attached the A-pillar 16 in a conventional manner using, for example, via mechanical fasteners, snap-fitting tabs, rivets or other mechanical attachment elements. The A-pillar trim assembly 32 has an opening 34 adjacent to a side portion of the windscreen 22.

The retractable sunvisor assembly 12 includes a base portion 40 (a base), an extensible mechanism 42, a spring-loaded roll-up shade mechanism 44, a motor 46 and a trim panel 48. As shown in FIGS. 3 and 4, the base portion 40 is basically a bracket directly attached to the pillar member 30 of the A-pillar 16. However, it should be understood from the drawings and the description hereinbelow that the base portion 40 can be omitted with the other elements of the retractable sunvisor assembly 12 being directly attached to the pillar member 30 of the A-pillar 16.

The extensible mechanism 42 includes an array or plurality of pivoting brackets 50 all having approximately the same overall length and dimensions. However, variations in dimensions of the brackets 50 are also contemplated depending upon the shape of the windscreen 22 and portion of the windscreen 22 to be covered by the retractable sunvisor assembly 12 when in use.

In the depicted embodiment, there are six pivoting brackets 50. However, it should be understood from the drawings and the description hereinbelow that additional pivoting brackets 50 can be added to the brackets 50 depicted below in order to increase the overall length of the retractable sunvisor assembly 12 when in use. Each pivoting bracket 50 has three pivot points $P_1$, $P_2$ and $P_3$ where the pivoting brackets 50 are attached to other elements and/or other pivoting brackets 50 by pivot pins or pivot shafts.

A first bracket 50a of the pivoting brackets 50 (left side of FIGS. 3 and 4) has an upper end where the upper pivot point $P_1$ is attached to a bracket 52 that is fixed to the base portion 40. The middle pivot point $P_2$ of the first bracket 50a is attached to the middle pivot point $P_2$ of a second bracket 50b of the pivoting brackets 50. The lower pivot point $P_3$ of the first bracket 50a is attached to the lower pivot point $P_3$ of a third bracket 50c. Further, the upper pivot point $P_1$ of the second bracket 50b of the pivoting brackets 50 is attached to a fourth bracket 50d, while middle pivot point $P_2$ of the fourth bracket 50d is attached to the middle pivot point $P_2$ of a third bracket 50c of the pivoting brackets 50. The fifth and sixth brackets 50e and 50f similarly have the middle pivot point $P_2$ attached to one another for pivoting movement with respect to one another.

The pivot point $P_3$ of the fifth bracket 50e has a pivot pin that is fixed for pivotal movement to a bracket 54. The bracket 54 is fixed a lower end of the trim panel 48. Further, the pivot point $P_1$ of the sixth bracket 50f has a pivot pin that slides within a slot 58 of a bracket 56 that is fixed to the trim panel 48.

The lower end of the second bracket 50b includes a gear G that pivots relative to the lower end of the second bracket 50b. The gear G engages a linear gear 62 fixedly attached to the base portion 40. The motor 46 is connected to the gear G via, for example, a flexible shield/cable 64 with an inner cable dimensioned and manufactured to transmit torque. Since such flexible shield/cables are conventional mechanisms, further description is omitted for the sake of brevity.

Operation of the motor 46 via a two-way switch (not shown) causes the motor 46 to rotate in a selected direction to either extend or retract the retractable sunvisor assembly 12. The two-way switch can be installed at any of a variety of locations within the vehicle 10, such as, for example, an arm rest on the door adjacent to the A-pillar 16, the center console with the passenger compartment or on the A-pillar 16 itself.

FIG. 3 shows the retractable sunvisor assembly 12 with the extensible mechanism 42 in a retracted orientation with all elements of the retractable sunvisor assembly 12 positioned along-side the pillar member 30 and with the trim panel 48 covering the opening 34 in the trim assembly 32. FIGS. 1, 2 (in phantom) and 4 shows the retractable sunvisor assembly 12 with the extensible mechanism 42 in an extended in-use orientation with the trim panel 48 moved away from the pillar member 30 and away from the trim assembly 32. Specifically, in FIGS. 1, 2 and 4, a portion of the retractable sunvisor assembly 12 covers an upper area of the windscreen 22.

The spring-loaded roll-up shade mechanism 44 includes an extensible flexible sunvisor shade 66. The spring-loaded roll-up shade mechanism 44 is fixed to the base portion 40 and/or the pillar member 30. The shade 66 is retained within the spring-loaded roll-up shade mechanism 44. An exposed end of the shade 66 is fixed to either the trim panel 48 or to distal ends of the brackets 50e and 50f of the extensible mechanism 42. When the extensible mechanism 42 in the retracted orientation (FIG. 3), the shade 66 is retracted into a cylindrical housing of the shade mechanism 44. A tensioned coil spring (not shown) within the cylindrical housing of the shade mechanism 44 biases the shade 66 to roll up within the cylindrical housing of the shade mechanism 44. Operation of the motor 46 to move the retractable sunvisor assembly 12 to the extended in-use orientation draws the shade 66 out of the housing of the shade mechanism 44 to the windscreen covering orientation shown in FIGS. 1, 2 and 4.

The extensible mechanism 42 is often referred to as a scissors-type extending device.

In the first embodiment, the extensible mechanism 42 (pivot brackets 50) is operated via the motor 46. Alternatively, the extensible mechanism 42 can be operated manually by a passenger. For example, the motor 46, gear G, linear gear 62 and the cable 64 can be eliminated. A handle (not shown) can be installed to the trim panel 48 such that a passenger can manually pull the retractable sunvisor assembly 12 into the in-use orientation and push the handle (not shown) to put the retractable sunvisor assembly 12 into the stowed or concealed orientation.

Second Embodiment

Figure 5:
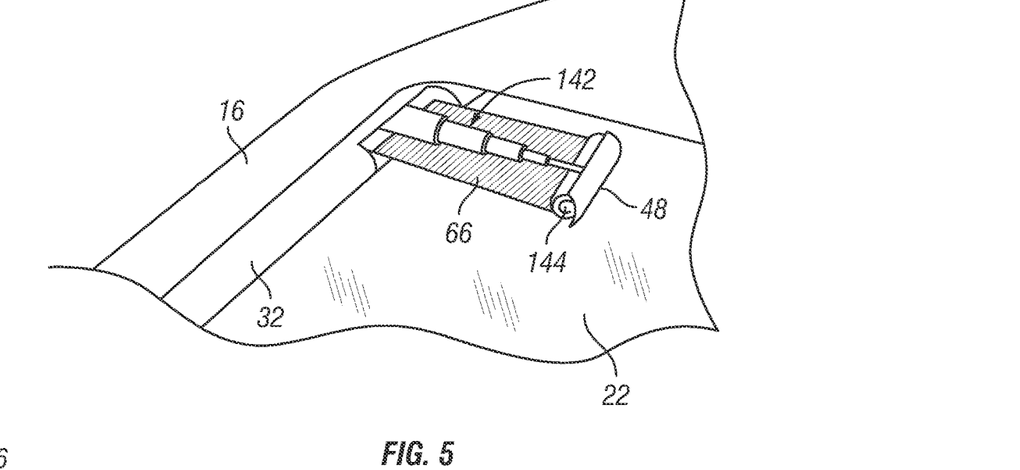
FIG. 5 is a schematic front perspective view of a portion the A-pillar and a retractable sunvisor assembly with the retractable sunvisor assembly in an extended or in-use orientation in accordance with a second embodiment.
Figure 6:
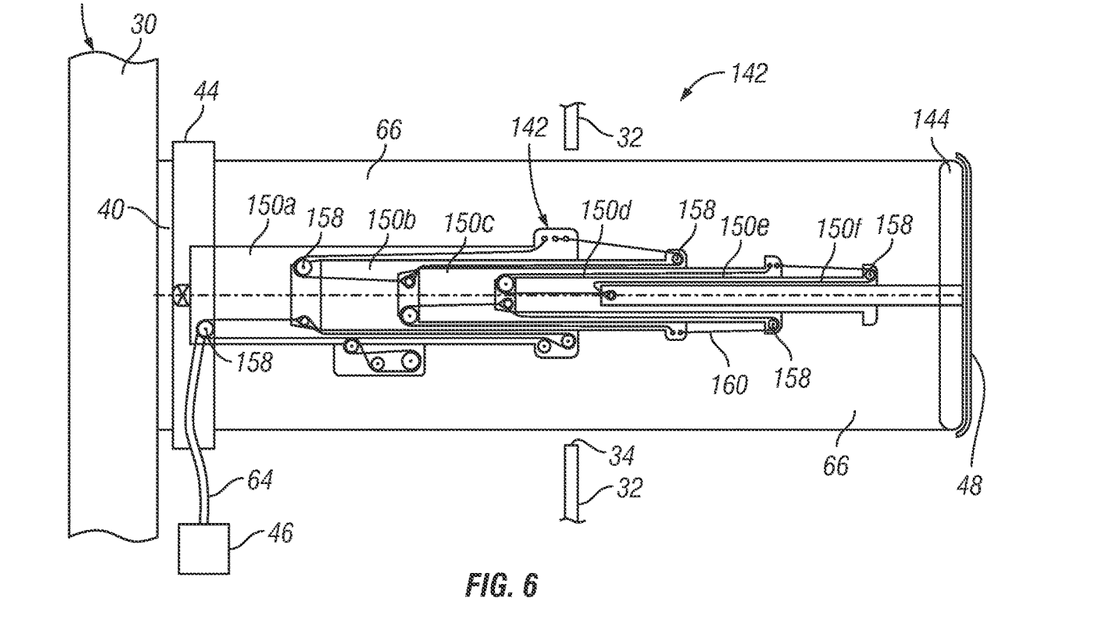
FIG. 6 is a schematic front view of the portion of the A-pillar and the retractable sunvisor assembly depicted in FIG. 5 with the retractable sunvisor assembly in a extended or in-use orientation in accordance with the second embodiment.
Figure 7:
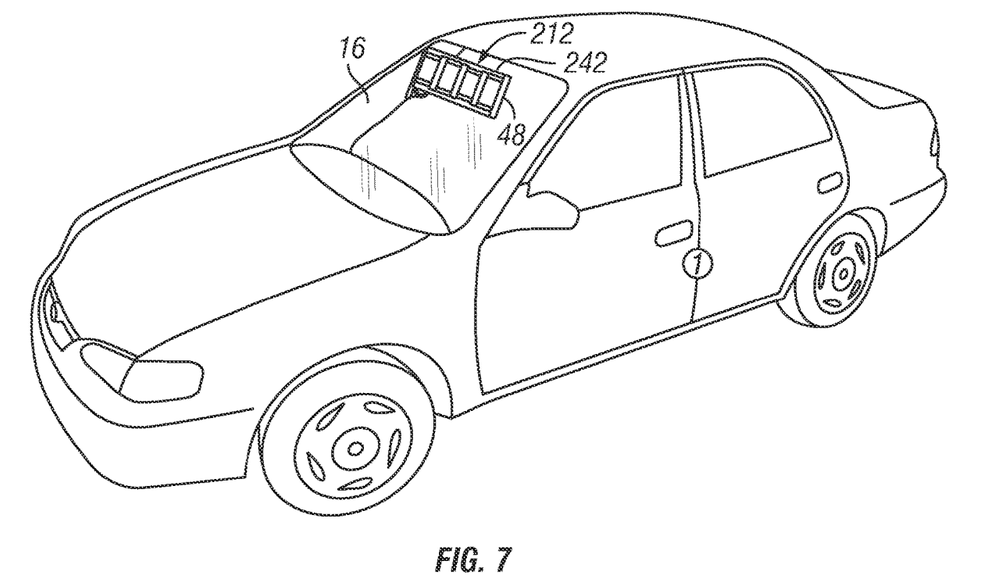
FIG. 7 is a perspective view of the vehicle showing a retractable sunvisor assembly attached to an A-pillar in an extended or in-use orientation in accordance with a third embodiment.
Figure 8:
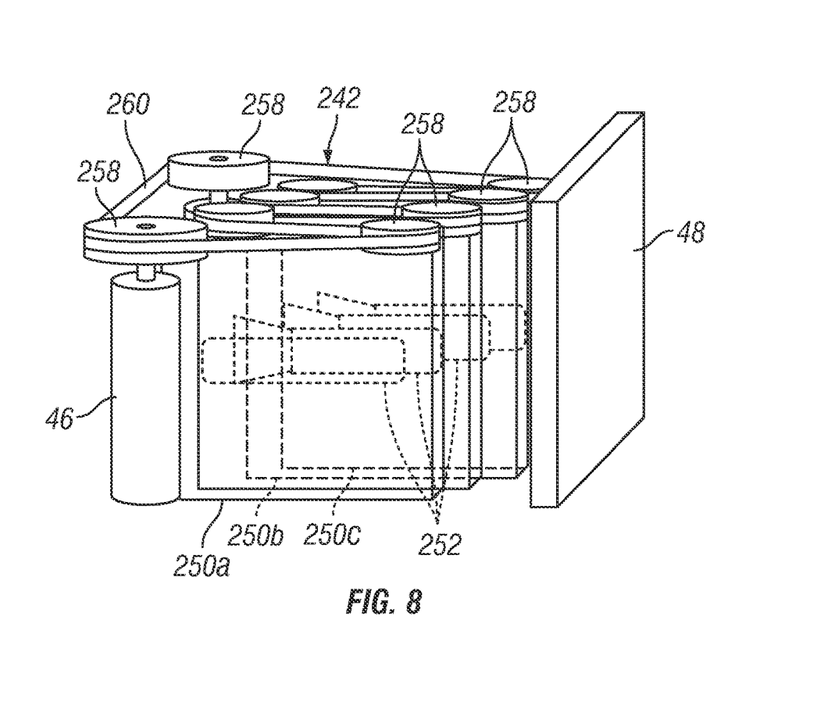
FIG. 8 is a schematic view of the retractable sunvisor assembly shown removed from the A-pillar showing a plurality of panels that slide relative to one another in a retracted or stowed orientation in accordance with the third embodiment.

Referring now to FIGS. 5 and 6, a retractable sunvisor assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the retractable sunvisor assembly 112 includes all elements of the retractable sunvisor assembly 12 of the first embodiment, except the extensible mechanism 42. Specifically, in the second embodiment, the extensible mechanism 42 has been replaced with an extensible mechanism 142 shown in FIGS. 5 and 6.

The extensible mechanism 142 is basically a telescoping assembly that includes a plurality of concentrically nested (or arranged) tubes 150a, 150b, 150c, 150d, 150e and 150f. Specifically, the first tube 150a is attached to the base portion 40 or the pillar member 30. In a stowed or concealed orientation, a majority of the overall length of each of the tubes 150b, 150c, 150d, 150e and 150f are nestled into the adjacent tube. In the in-use orientation shown in FIGS. 5 and 6, the tubes 150b, 150c, 150d, 150e and 150f are moved away from the pillar member 30 of the A-pillar 16 pulling the shade 66 out of the roll-up shade mechanism 44. The motor 46 powers a plurality of pulleys 158 via an endless belt 160. The pulleys 158 and endless belt 160 are arranged such that rotation of the motor 46 via the cable 64 in a first direction causes the endless belt 160 and pulleys 158 to move the extensible mechanism 142 from the stowed orientation to the extended or in-use orientation. Rotation of the motor 46 in a reverse direction causes the pulleys 158 and endless belt 160 to move the extensible mechanism 142 from the extended or in-use orientation to the stowed orientation.

In the second embodiment, the extensible mechanism 142 is operated via the motor 46. Alternatively, the extensible mechanism 142 can be operated manually by a passenger. For example, the motor 46, pulleys 158 and endless belt 160 can be eliminated. A handle (not shown) can be installed to the trim panel 48 such that a passenger can manually pull the retractable sunvisor assembly 112 to the in-use orientation and push the handle (not shown) to put the retractable sunvisor assembly 112 into the stowed or concealed orientation.

Third Embodiment

Referring now to FIGS. 7-16, a retractable sunvisor assembly 212 in accordance with a second embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The retractable sunvisor assembly 212 includes many of the elements of the retractable sunvisor assembly 12 of the first embodiment, except that the extensible mechanism 42 and the spring-loaded roll-up shade mechanism 44 are replaced with a plurality of panels 250a thru 250d and an endless belt and pulley system 242.

The plurality of panels 250a thru 250d are shown in FIGS. 8-13 with the following features. Each panel 250a thru 250d is a square or rectangular panel. Panels 250a, 250b and 250c include a recess 252 with return portions 254 that are shaped and dimensioned to retain projections 256 (described below) such that the projections 256 can easily slide within the recess 252. In other words, the recess 252 and return portions 254 define a track that retains a corresponding one of the projections 256 such that any one of the panels 250a thru 250d can slide along the recess 252 of an adjacent one of the panels 250a thru 250d.

A corresponding one of the projections 256 protrude from a side of the corresponding one of the panels 250b, 250c and 250d opposite the recess 252. Each projection 256 is dimensioned to fit within the recess 252 and is retained within the recess 252 by the return portions 254.

Figure 15:
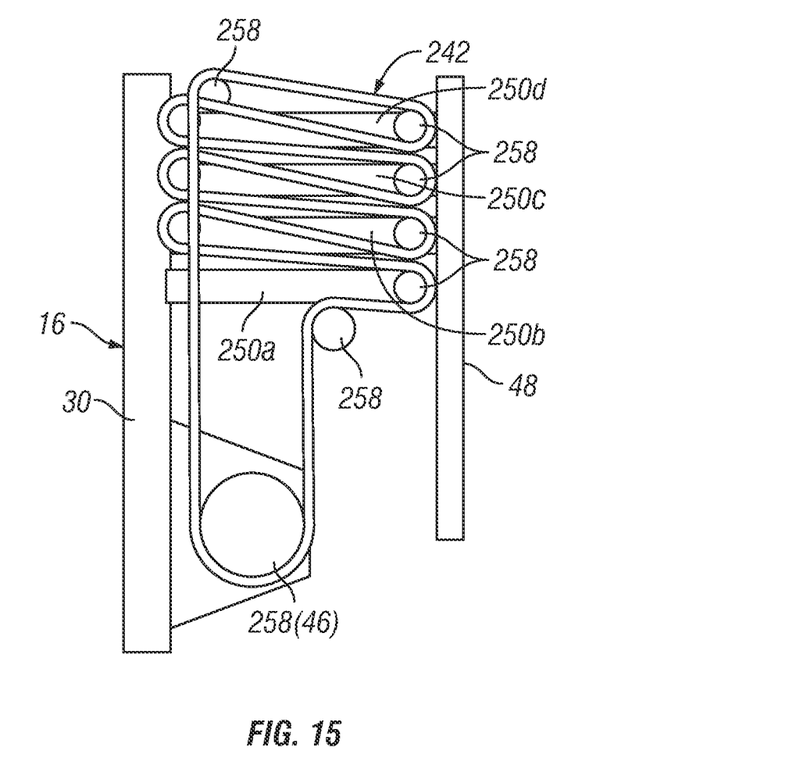
FIG. 15 is a top schematic view of the retractable sunvisor assembly with the panels and elements of an extensible mechanism shown in the retracted or stowed orientation in accordance with the third embodiment.
Figure 16:
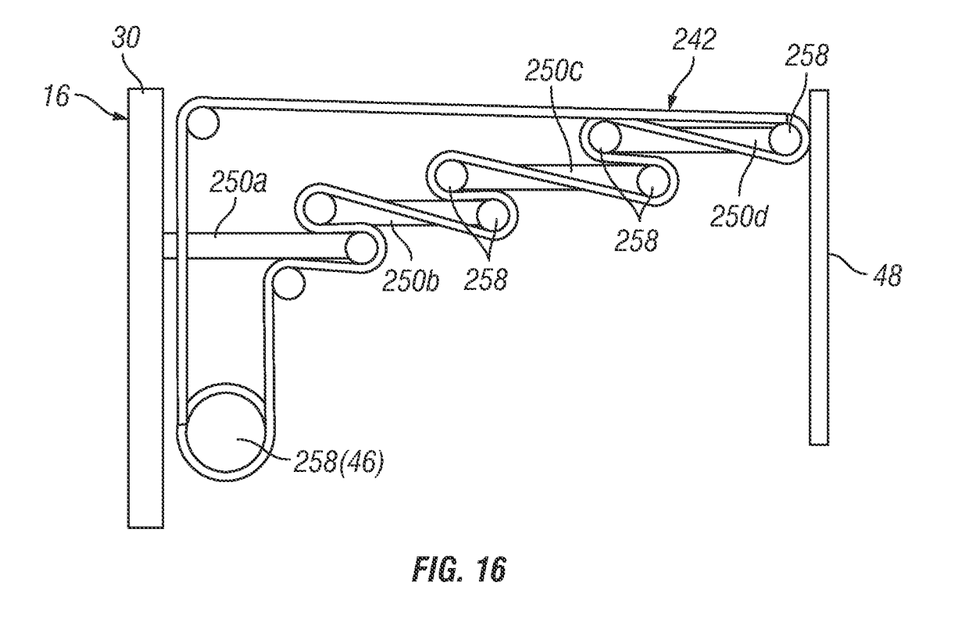
FIG. 16 another top schematic view of the retractable sunvisor assembly with the panels and the elements of the extensible mechanism shown in the extended or in-use orientation in accordance with the third embodiment.

The endless belt and pulley system 242 (the extensible mechanism 242) includes pulleys 258 and an endless belt 260.

Figure 9:
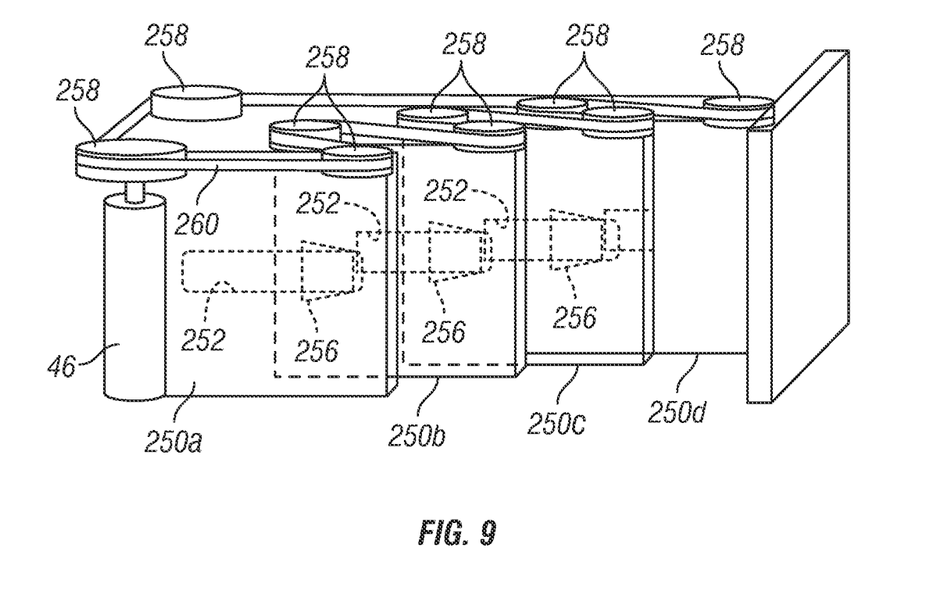
FIG. 9 is another schematic view of the retractable sunvisor assembly depicted in FIGS. 7 and 8 shown removed from the A-pillar with the plurality of panels in an extended or in-use orientation in accordance with the third embodiment.
Figure 10:
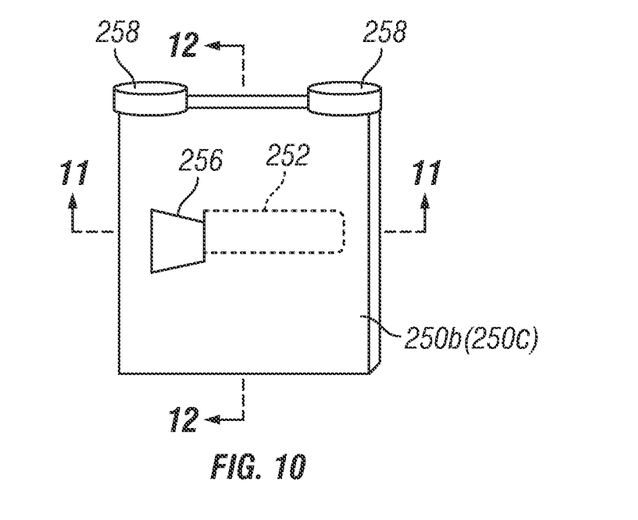
FIG. 10 is a schematic view of one of the plurality of panels depicted in FIGS. 8 and 9 showing a projection and a corresponding groove (in phantom) that enable adjacent pairs of the panels to slide relative to one another and remain adjacent to one another in accordance with the third embodiment.
Figure 11:
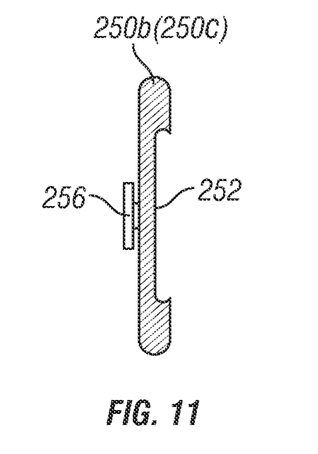
FIG. 11 is a cross-sectional view of one of the panels taken along the line 11-11 in FIG. 10 showing the projection and the groove of the panel in accordance with the third embodiment.
Figure 12:
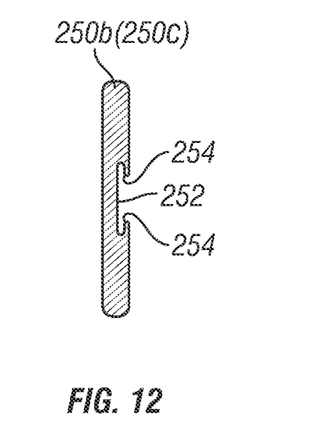
FIG. 12 is a cross-sectional view of one of the panels taken along the line 12-12 in FIG. 10 showing the groove of the panel in accordance with the third embodiment.
Figure 13:
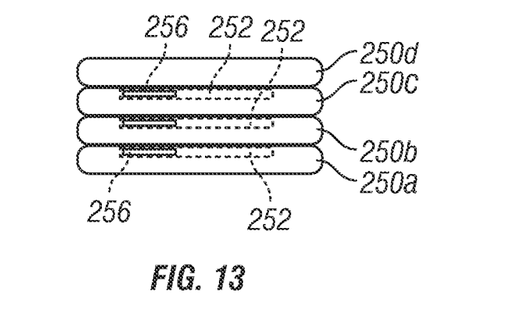
FIG. 13 is a top view of the plurality of panels showing the projections and grooves in phantom and their interconnected relationship with the plurality of panels in a retracted or stowed orientation in accordance with the third embodiment.
Figure 14:
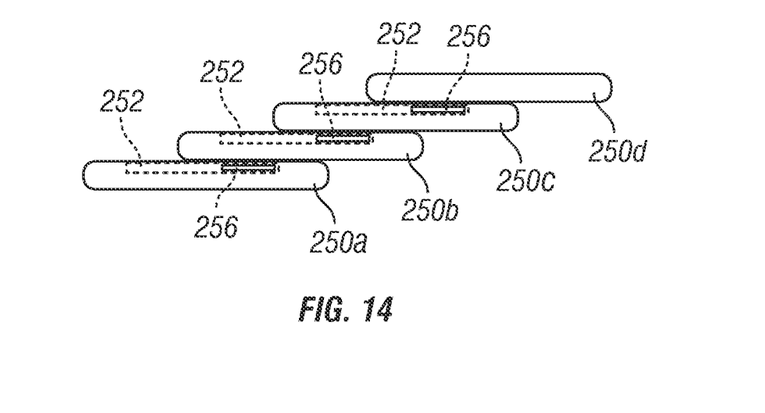
FIG. 14 is another top view of the plurality of panels showing the projections and grooves in phantom and their interconnected relationship with the plurality of panels in an extended or in-use orientation in accordance with the third embodiment.

The motor 46 powers the pulley 258 attached to the motor 46 and the endless belt 260 wraps around all of the other pulleys 258 such that operation of the motor 46 moves the endless belt 160 and rotates all of the pulleys 258. The pulleys 258 and endless belt 260 are arranged such that rotation of the motor 46 in a first direction causes the endless belt 260 and pulleys 258 to move the panels 250b, 250c and 250d away from the B-pillar 16 and the stowed orientation (FIGS. 8, 13 and 15) to the in-use or extended orientation (FIGS. 9, 14 and 16). Rotation of the motor 46 in a reverse direction causes the pulleys 258 and endless belt 260 to move the panels 250b, 250c and 250d from the extended or in-use orientation to the stowed orientation.

The projections 256 and recesses 252 ensure that the panels 250a thru 250d are interconnected to one another such that in the extended in-use orientation the plurality of interconnected panels 250a thru 250d define a sun-shade.

Fourth Embodiment

Figure 17:
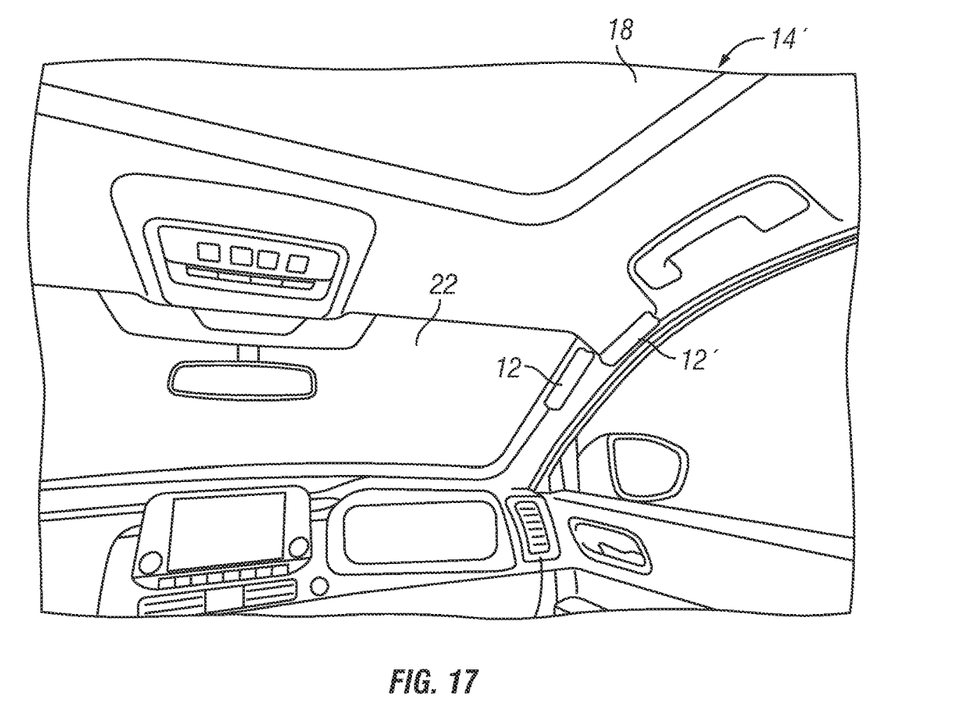
FIG. 17 is a perspective view of the forward portion of the passenger compartment within the vehicle body structure showing the windscreen, the A-pillar, a first sunvisor assembly in a retracted or stowed orientation and a second sunvisor assembly in a retracted or stowed orientation in accordance with a fourth embodiment.
Figure 18:
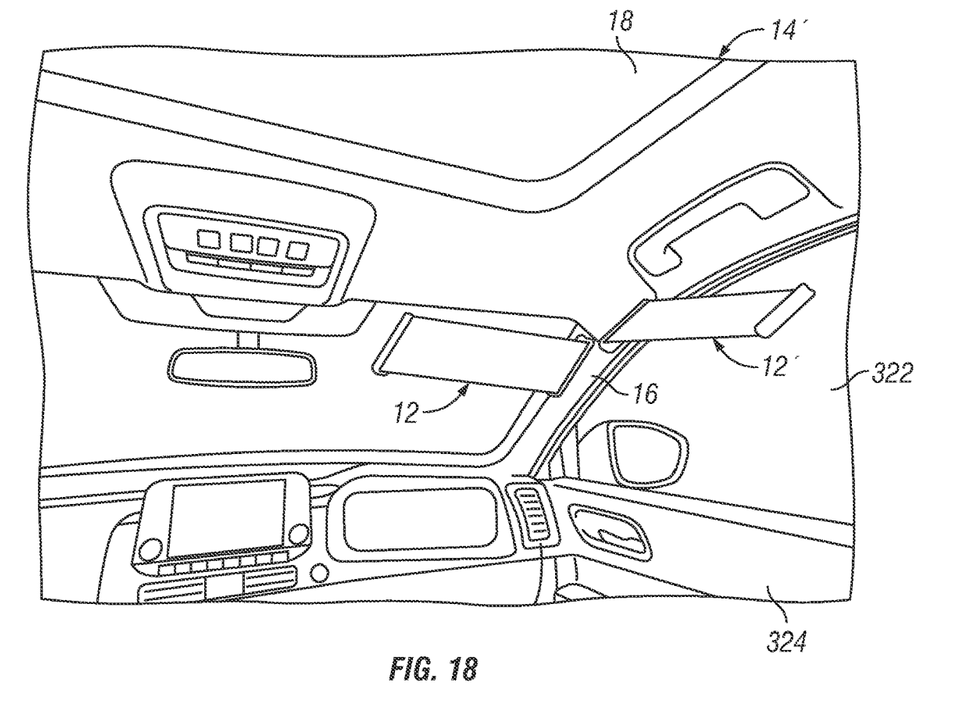
FIG. 18 is another perspective view of the forward portion of the passenger compartment similar to FIG. 17 with the first sunvisor assembly in an extended or in-use orientation covering a portion of the windscreen and the second sunvisor assembly in an extended or in-use orientation covering a portion of a door window in accordance with a fourth embodiment.

Referring now to FIGS. 17 and 18, a vehicle body structure 14' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

The vehicle body structure 14' includes the retractable sunvisor assembly 12, as described above with reference to the first embodiment. However, in the fourth embodiment, the vehicle body structure 14' includes a second sunvisor assembly 12'. The second sunvisor assembly 12' is identical to the retractable sunvisor assembly 12, except that the second sunvisor assembly 12' is positioned on the A-pillar 10 to cover an upper area of a window 322 of a door 324 when in the extended or in-use orientation shown in FIG. 18.

The vehicle 10 includes many devices and structures are conventional components that are well known in the art. Since these devices and structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle sunvisor assembly. Accordingly, these terms, as utilized to describe the present invention should be interpreted relative to a vehicle equipped with the vehicle sunvisor assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle sunvisor assembly, comprising:
    a vehicle body structure that includes an A-pillar, a windscreen and a roof structure with the A-pillar and the windscreen extending downward from the roof structure; and
    a retractable sunvisor assembly attached to the A-pillar below the roof structure such that in a retracted orientation the retractable sunvisor assembly is positioned along-side the A-pillar and in an extended in-use orientation a portion of the retractable sunvisor assembly extends away from the A-pillar covering an upper area of the windscreen, the retractable sunvisor assembly including a base portion directly attached to the A-pillar, an extensible mechanism supported to the base portion and a spring-loaded roll-up shade mechanism having an extensible flexible sunvisor shade,
    the extensible mechanism including an electric motor and a telescoping assembly, the electric motor powering the extensible mechanism thereby moving the sunvisor shade between the retracted orientation and the extended in-use orientation, the telescoping assembly has a plurality of concentrically nested tubes including at least a base tube, a first tube, a second tube, a third tube and a final tube, the base tube being attached to the A-pillar and the final tube being coupled to a movable end of the sunvisor shade, each of the first, second and third tubes having a pulley rotatably attached thereto, with at least one endless belt extending around each of the pulleys of the first, second, third and final tubes, the motor powering the endless belt such that rotation of the motor in a first direction causes the movable end of the sunvisor shade to move away from the A-pillar drawing the first, second, third and final tubes to at least partially move out of one another and rotation of the motor in a second direction draws the movable end of the sunvisor shade toward the A-pillar drawing the first, second, third and final tubes to return to a nested orientation concentrically within one another.

2. The vehicle sunvisor assembly according to claim 1, further comprising
    an A-pillar trim assembly attached the A-pillar, the A-pillar trim assembly having an opening adjacent to a side portion of the windscreen;
    the retractable sunvisor assembly being dimensioned and configured such that in the retracted orientation the retractable sunvisor assembly is located within the A-pillar trim assembly and in the extended in-use orientation a portion of the retractable sunvisor assembly extends through the opening in the A-pillar trim assembly; and
    a trim panel attached to a distal end of the retractable sunvisor assembly such that with the retractable sunvisor assembly in a retracted orientation, the trim panel and the A-pillar trim assembly completely cover and conceal the retractable sunvisor assembly.

3. The vehicle sunvisor assembly according to claim 1, further comprising
    a second sunvisor assembly attached to the A-pillar below the roof structure such that in a retracted orientation the retractable sunvisor assembly is positioned along-side the A-pillar and in an extended in-use orientation a portion of the second sunvisor assembly extends away from the A-pillar covering an upper area of a door window.

4. A vehicle sunvisor assembly, comprising:
    a vehicle body structure that includes an A-pillar, a windscreen and a roof structure with the A-pillar and the windscreen extending downward from the roof structure;
    an A-pillar trim assembly attached the A-pillar, the A-pillar trim assembly having an opening adjacent to a side portion of the windscreen;
    a retractable sunvisor assembly attached to the A-pillar below the roof structure such that in a retracted orientation the retractable sunvisor assembly is located within the A-pillar trim assembly and in an extended in-use orientation a portion of the retractable sunvisor assembly extends through the opening in the A-pillar trim assembly covering an upper area of the windscreen; and a trim panel attached to a distal end of the retractable sunvisor assembly such that with the retractable sunvisor assembly in a retracted orientation, the trim panel and the A-pillar trim assembly completely cover and conceal the retractable sunvisor assembly, the retractable sunvisor assembly includes an electric motor, a plurality of interconnected panels that slide relative to one another and an endless belt, the motor having a pulley and each of the interconnected panels having a pulley with the endless belt wrapping partially around each of the pulleys such that rotation of the motor in a first direction causes the plurality of interconnected panels slide relative to one another to the extended in-use orientation and rotation of the motor in a second direction causes the plurality of interconnected panels to slide relative to one another to the retracted orientation such that in the extended in-use orientation the plurality of interconnected panels define a sunvisor shade.

5. The vehicle sunvisor assembly according to claim 4, further comprising a second sunvisor assembly attached to the A-pillar below the roof structure such that in a retracted orientation the retractable sunvisor assembly is positioned along-side the A-pillar and in an extended in-use orientation a portion of the second sunvisor assembly extends away from the A-pillar covering an upper area of a door window.

* * * * *